US011720954B2

(12) United States Patent
Law et al.

(10) Patent No.: US 11,720,954 B2
(45) Date of Patent: *Aug. 8, 2023

(54) IMAGE-BASED LISTING USING IMAGE OF MULTIPLE ITEMS

(71) Applicant: eBay Inc., San Jose, CA (US)

(72) Inventors: Philip Law, San Jose, CA (US); Trisha Lee Okubo, San Jose, CA (US); Choon Chong, San Franciso, CA (US); Yuan Der Ho, San Mateo, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,687

(22) Filed: Dec. 20, 2021

(65) Prior Publication Data

US 2022/0114651 A1 Apr. 14, 2022

Related U.S. Application Data

(63) Continuation of application No. 15/656,266, filed on Jul. 21, 2017, now Pat. No. 11,244,379, which is a
(Continued)

(51) Int. Cl.
G06Q 30/00 (2023.01)
G06Q 30/0601 (2023.01)
G06Q 30/08 (2012.01)
G06Q 30/02 (2023.01)
G06Q 30/0241 (2023.01)

(52) U.S. Cl.
CPC ......... *G06Q 30/0641* (2013.01); *G06Q 30/02* (2013.01); *G06Q 30/0277* (2013.01); *G06Q 30/0601* (2013.01); *G06Q 30/0603* (2013.01); *G06Q 30/0613* (2013.01); *G06Q 30/0643* (2013.01); *G06Q 30/08* (2013.01)

(58) Field of Classification Search
CPC ............... G06Q 30/0641; G06Q 30/02; G06Q 30/0277; G06Q 30/0601; G06Q 30/0603; G06Q 30/08
See application file for complete search history.

(56) References Cited

U.S. PATENT DOCUMENTS 6,070,167 A 5/2000 Qian et al.
6,732,161 B1 5/2004 Hess et al.
(Continued)

OTHER PUBLICATIONS

"Online Visual Merchandising (VMD) of apparel web sites," by Young Ha, Wi-Suk Kwon, and Sharron J. Lennon, Journal of Fashion Marketing and Management, vol. 11, No. 4, 2007 (Year: 2007).*

(Continued)

Primary Examiner — Anne M Georgalas
(74) Attorney, Agent, or Firm — Holland & Hart LLP

(57) ABSTRACT

Example embodiments of a system and method for image-based listing of an item, using an image of multiple items, are generally described herein. In some example embodiments, an image-based listing system includes an identifying module to identify a portion of an image of multiple items, the portion of the image depicting the item; a tagging module to associate tag information with the portion of the image, the tag information being associated with the item; and a listing module to list the item, the listing of the item comprising displaying at least some tag information.

20 Claims, 10 Drawing Sheets

Related U.S. Application Data continuation of application No. 12/277,220, filed on Nov. 24, 2008, now Pat. No. 9,715,701.

(56) References Cited

U.S. PATENT DOCUMENTS

| | | | |
|---|---|---|---|
| 6,941,276 B2 | 9/2005 | Haeberli et al. | |
| 7,315,833 B2 | 1/2008 | Schrenk | |
| 7,627,502 B2* | 12/2009 | Cheng | G06Q 30/0633 |
| | | | 705/26.8 |
| 7,668,821 B1* | 2/2010 | Donsbach | G06Q 30/0631 |
| | | | 707/765 |
| 7,953,277 B2 | 5/2011 | Williams et al. | |
| 7,991,646 B2 | 8/2011 | Lewis et al. | |
| 8,121,902 B1* | 2/2012 | Desjardins | G06Q 30/0601 |
| | | | 705/26.1 |
| 8,136,028 B1 | 3/2012 | Loeb et al. | |
| 8,296,291 B1* | 10/2012 | Desjardins | G06Q 30/0603 |
| | | | 707/723 |
| 9,495,386 B2 | 11/2016 | Tapley et al. | |
| 9,715,701 B2 | 7/2017 | Law et al. | |
| 9,846,883 B2 | 12/2017 | Angell et al. | |
| 11,244,379 B2 | 2/2022 | Law et al. | |
| 2002/0097893 A1 | 7/2002 | Lee et al. | |
| 2002/0123955 A1 | 9/2002 | Andreski et al. | |
| 2002/0174035 A1 | 11/2002 | Stern et al. | |
| 2003/0105682 A1* | 6/2003 | Dicker | G06Q 30/0253 |
| | | | 705/26.8 |
| 2004/0006509 A1 | 1/2004 | Mannik et al. | |
| 2006/0085277 A1 | 4/2006 | Arnston | |
| 2007/0005571 A1* | 1/2007 | Brewer | G06F 16/58 |
| 2007/0078832 A1* | 4/2007 | Ott | G06F 16/9535 |
| 2007/0220045 A1 | 9/2007 | Morris et al. | |
| 2008/0021928 A1 | 1/2008 | Yagnik | |
| 2008/0065995 A1* | 3/2008 | Bell | G06F 40/117 |
| | | | 715/764 |
| 2008/0082426 A1* | 4/2008 | Gokturk | G06Q 30/0623 |
| | | | 707/E17.014 |
| 2008/0082486 A1 | 4/2008 | Lermant et al. | |
| 2008/0091549 A1 | 4/2008 | Chang et al. | |
| 2008/0109841 A1 | 5/2008 | Heather et al. | |
| 2008/0201218 A1 | 8/2008 | Broder et al. | |
| 2008/0215456 A1 | 9/2008 | West et al. | |
| 2008/0226119 A1 | 9/2008 | Candelore et al. | |
| 2008/0268876 A1 | 10/2008 | Gelfand et al. | |
| 2008/0282177 A1 | 11/2008 | Brown et al. | |
| 2008/0288338 A1* | 11/2008 | Wiseman | G06Q 30/0277 |
| | | | 705/14.69 |
| 2008/0317346 A1 | 12/2008 | Taub | |
| 2009/0034782 A1 | 2/2009 | Gering | |
| 2009/0094260 A1 | 4/2009 | Cheng et al. | |
| 2010/0131388 A1 | 5/2010 | Law et al. | |
| 2013/0121571 A1 | 5/2013 | Gokturk et al. | |
| 2017/0323352 A1 | 11/2017 | Law et al. | |

OTHER PUBLICATIONS

Auction PAL Turns Unwanted Items into Cash, Business Wire, Retrieved from the Internet URL : <https://www.businesswire.com/news/home/20071029005288/en/auctionPAL-Turns-Unwanted-Items-into-Cash>, Oct. 29, 2007, 2 pages.

AuctionWatch Provides Pies for Online Auctions, Newsbytes News Network: Washingtonpost Newsweek Interactive. Dec. 14, 1999, 2 pages.

Advisory Action received for U.S. Appl. No. 12/277,220, dated Oct. 7, 2015, 3 pages.

Final Office Action Received for U.S. Appl. No. 12/277,220, dated Feb. 2, 2010, 18 pages.

Final Office Action Received for U.S. Appl. No. 12/277,220, dated Oct. 25, 2012, 19 pages.

Final Office Action Received for U.S. Appl. No. 12/277,220, dated May 5, 2015, 20 pages.

Non Final Office Action received for U.S. Appl. No. 12/277,220, dated Sep. 10, 2014, 19 pages.

Non-Final Office Action Received for U.S. Appl. No. 12/277,220, dated Jul. 10, 2009, 14 pages.

Non-Final Office Action Received for U.S. Appl. No. 12/277,220, dated Jul. 12, 2016, 36 pages.

Non-Final Office Action Received for U.S. Appl. No. 12/277,220, dated May 1, 2012, 19 pages.

Notice of Allowance received for U.S. Appl. No. 12/277,220, dated Mar. 22, 2017, 18 pages.

Advisory Action received for U.S. Appl. No. 15/656,266, dated Sep. 24, 2020, 3 pages.

Final Office Action received for U.S. Appl. No. 15/656,266, dated Jun. 8, 2021, 8 pages.

Final Office Action received for U.S. Appl. No. 15/656,266, dated May 28, 2020, 35 pages.

Non-Final Office Action received for U.S. Appl. No. 15/656,266, dated Oct. 28, 2019, 35 pages.

Non-Final Office Action received for U.S. Appl. No. 15/656,266, dated Feb. 9, 2021, 13 pages.

Notice of Allowance received for U.S. Appl. No. 15/656,266, dated Sep. 30, 2021, 17 pages.

\* cited by examiner

IMAGE-BASED LISTING USING IMAGE OF MULTIPLE ITEMS

CLAIM OF PRIORITY

This application is a continuation of U.S. application Ser. No. 15/656,266, filed Jul. 21, 2017, which is a continuation of and claims the benefit of priority of U.S. application Ser. No. 12/277,220, filed Nov. 24, 2008, now U.S. Pat. No. 9,715,701, which are hereby incorporated by reference in their entirety.

TECHNICAL FIELD

Some example embodiments relate generally to sales of goods and particularly to image-based listing using an image of multiple items.

BACKGROUND

Many people would like to use online selling to relieve themselves of unwanted items, but are inconvenienced by the work involved in creating an individual sales listing for each and every item they wish to sell. Furthermore, many people would like to estimate the level of interest in an item before undertaking the inconvenience to create a sales listing for that item. This inconvenience has spawned an industry of companies that sell items online for people in return for a fee. It would be helpful to enable a person to list multiple items for potential or actual sale. An example of a technical challenge that may exist is allowing a person to list multiple items by using an image (e.g., a digital photograph).

BRIEF DESCRIPTION OF THE DRAWINGS

Some embodiments are illustrated by way of example and not limitation in the figures of the accompanying drawings in which.

DETAILED DESCRIPTION

Example systems and methods are described and directed to image-based listing of an item, using an image of multiple items. Examples merely typify possible variations. Individual components and functions are optional unless explicitly required, and the sequence of operations may vary. In the following description, for purposes of explanation, numerous specific details are set forth to provide a thorough understanding of example embodiments. It will be evident, however, to one skilled in the art that the present invention may be practiced without these specific details.

A user who wishes to list a number of items first transfers the image (e.g., a photograph) depicting the items to an example system for listing an item using an image of multiple items. The user is then able to mark an item to be listed by marking a portion of the image (e.g., the portion showing the item). For example, the user may mark a portion of the image by drawing a box around the item in the image. The user then can "tag" the item, i.e., associate "tag information" with the item, by entering information to be associated with the marked portion of the image. Tag information may include a description, a label, a price, and/or one or more categories. The tagged item is then listed for potential or actual sale.

To accommodate a user who desires to estimate the level of interest in certain items, the user may be permitted to tag items with relatively basic information, e.g., a short description. To accommodate a user who desires to sell certain items, the user may be allowed to tag items with relatively detailed information, e.g., a full description, a price, and/or one or more categories.

One possible effect is to create a virtual Internet-based yard sale. For example, a person can take a digital photograph of a corner of a garage containing many unwanted items and use an example system to list some, but not necessarily all, items appearing in the photograph. As described above, the user need not list items for actual sale, but may list items solely to test for interest in the items among potential buyers.

Once listed, one or more items are displayed to potentially interested persons, including potential buyers. In some embodiments, a listed item appears with its associated tag information and/or a "thumbnail" image of the item (a reduced-size version of the marked portion of the image of multiple items). In some embodiments, a listed item appears in its original context (e.g., in the image transferred by the user) with some associated tag information appearing in a pop-up window responsive to a "mouse-over" event (e.g., mouse cursor movement over and/or near the marked portion of the image). In some embodiments, a listed item appears separated from other listed items, e.g., as a thumbnail image of the item in visual association with a line text containing some tag information.

Figure 1:
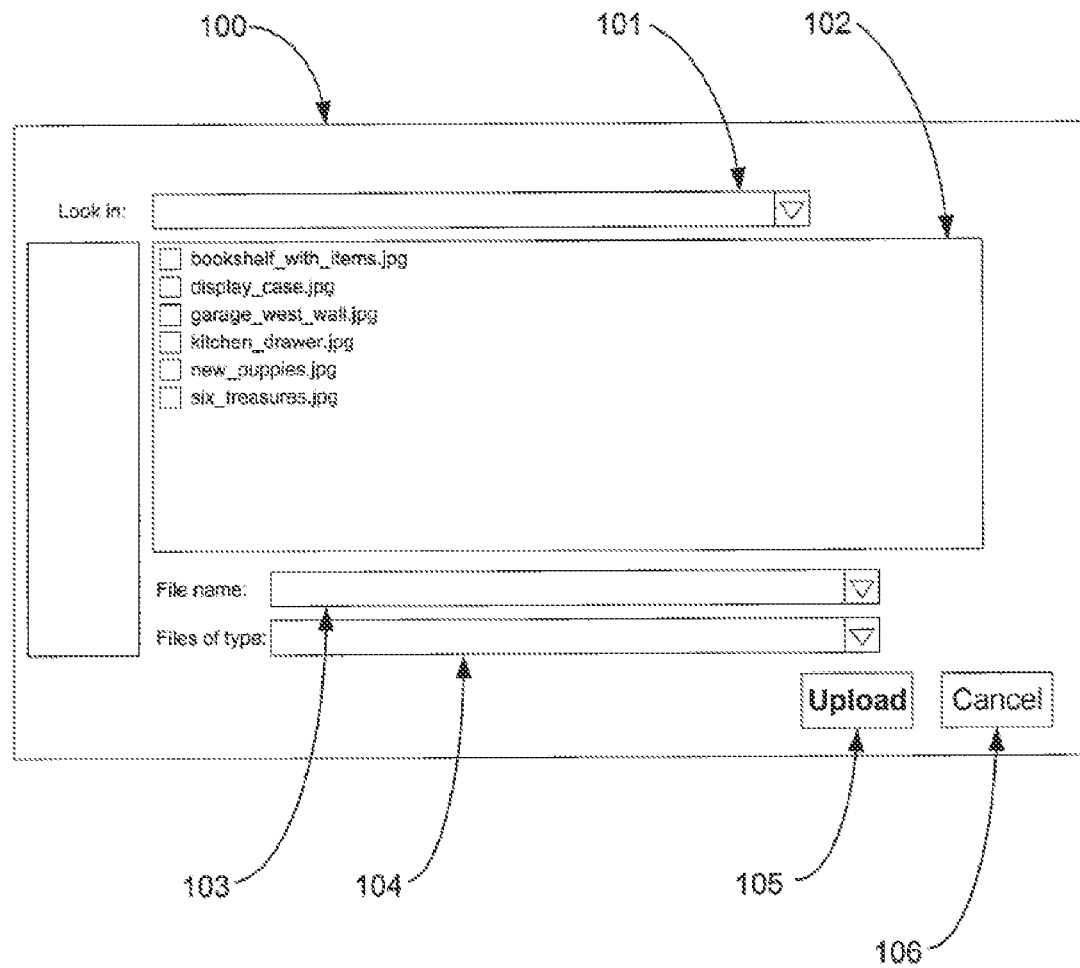
FIG. 1 illustrates an example of a user interface for facilitating a transfer of an image of multiple items.

FIG. 1 illustrates an example of a user interface for facilitating a transfer of an image of multiple items. A graphical window 100 contains a location field 101, a file selection tool 102, a file name field 103, a file filter tool 104, a transfer execution button 105, and a transfer cancellation button 106.

The location field 101 allows a user to transfer an image from a specified location (e.g., a folder or directory in a local file system, or a folder or directory in a networked remote file system) to an example system. For example, a user could specify a uniform resource locator (URL) in the location field 101. As another example, a user could specify a file path to a file name of a file containing data that constitutes the image.

The file selection tool 102 allows a user to select from multiple files in the specified location. The file filter tool 104 allows a user to view, in the file selection tool 102, a subset of all files in the specified location. The file name field 103 allows a user to directly specify a file name of a file to be transferred.

The transfer execution button 105 begins the transfer of the selected image. The transfer cancellation button 106 dismisses the graphical window 100 without beginning the transfer of an image.

Figure 2:
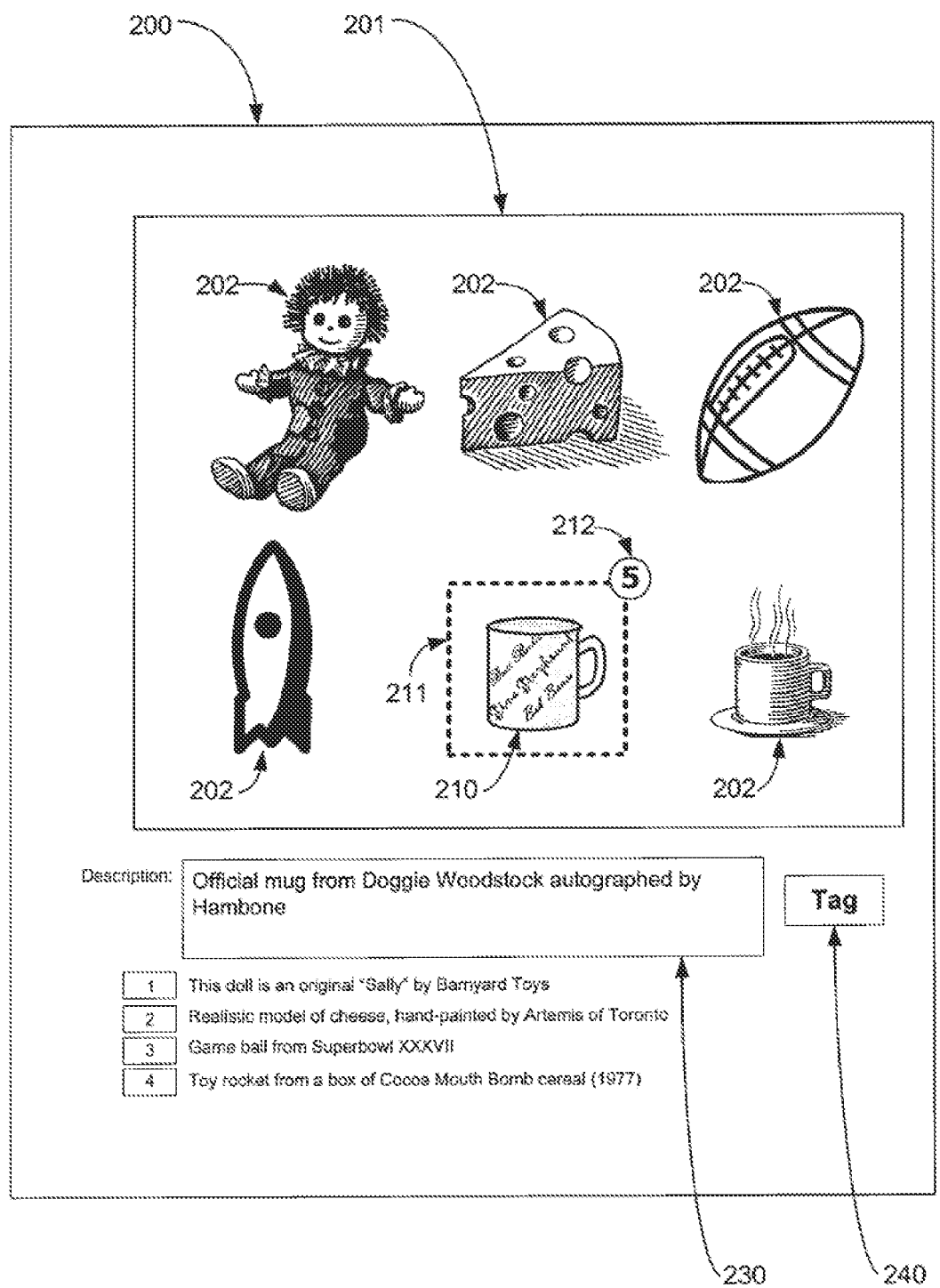
FIG. 2 illustrates an example of a user interface for marking a portion of the image and tagging the portion with information.

FIG. 2 illustrates an example of a user interface for marking a portion of an image of multiple items and tagging the portion with information. A graphical window 200 contains a marked image 201, one or more items 202, a marked item to be listed 210, a drawn box 211, an item reference 212, a description field 230, and a tag execution button 240.

The drawn box 211 allows a user to mark a portion of the image by indicating (e.g., by circumscribing) the item to be listed 210. The description field 230 enables a user to enter a description to be associated with the marked item to be listed 210. The tag execution button 240 operates to associate the entered tag information with the marked item to be listed 210, resulting in tagging the marked item to be listed 210 with the description of the item.

In some embodiments, a single drawn box 211 appears at any given time. In some embodiments, multiple drawn boxes 211 appear on the marked image 201.

In some embodiments, the description field 230 appears in a pop-up window overlaying the marked image. In some embodiments, the description field 230 appears in a separate window. Some embodiments allow hyperlinks to be entered into the description field 230.

Certain embodiments omit the item reference 212. In some embodiments, the item reference 212 appears superimposed over the marked item to be listed 210. In some embodiments, some tag information associated with other tagged items appears in the graphical window 200.

Some embodiments omit the drawn box 211 and instead use a drawn circle, oval, or other shape. In some embodiments, the image and item are marked with a highlighting tool that alters the brightness, contrast, color hue, color saturation, and/or other visual characteristic or trait of the marked portion of the image.

Figure 3:
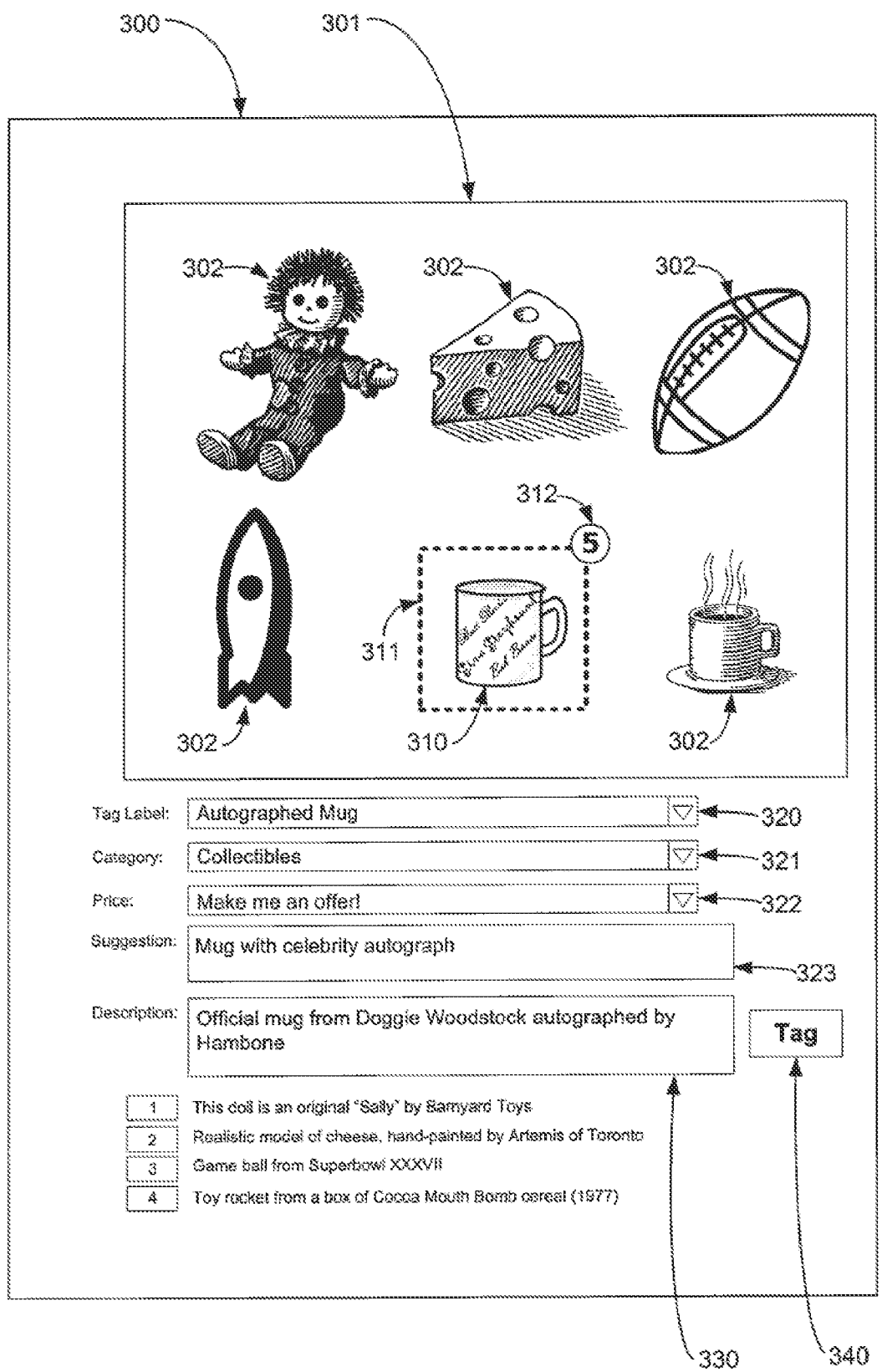
FIG. 3 illustrates an example of a user interface for marking a portion of the image and tagging the portion with information, including category and price.

FIG. 3 illustrates an example of a user interface for marking a portion of the image and tagging the portion with information, including category and price. A graphical window 300 contains a marked image 301, one or more items 302, a marked item to be listed 310, a drawn box 311, an item reference 312, a tag label field 320, a category field 321, a price field 322, a suggestion field 323, a description field 330, and a tag execution button 340.

The drawn box 311 allows a user to mark a portion of the image by indicating (e.g., by circumscribing) the item to be listed. The tag label field 320 enables a user to enter a label for tag information to be associated with the marked item to be listed 310. The category field 321 allows a user to enter or select one or more categories to be associated with the marked item to be listed 310. The price field 322 allows a user to specify a price to be associated with the marked item to be listed 310, or to specify that the price is not set. The suggestion field provides a suggested description based on one or more previously listed items. A previously listed item may be listed on any listing system in communication with the instant listing system and not necessarily the same listing system used by the user. The description field 330 enables the user to enter a description to be associated with the marked item to be listed 310. The tag execution button 340 operates to associate the entered tag information with the marked item to be listed 310, resulting in tagging the marked item to listed 310 with tag information.

In some embodiments, a single drawn box 311 appears at any given time. In some embodiments, multiple drawn boxes 311 appear on the marked image 301.

In some embodiments, one or more additional fields appear to the user and enable the user to enter additional tag information. Examples of additional tag information include manufacturer, model, year, size, length, width, height, diameter, radius, color, weight, or any other characteristic or trait of interest to a potential buyer. Some embodiments allow hyperlinks to be entered into the description field 330.

Certain embodiments omit the item reference 312. In some embodiments, the item reference 312 appears superimposed over the marked the item to be listed 310. In some embodiments, some tag information associated with other tagged items appears in the graphical window 300.

Some embodiments omit the drawn box 311 and instead use a drawn circle, oval, or other shape. In some embodiments, the image and item are marked with a highlighting tool that alters the brightness, contrast, color hue, and/or color saturation of the marked portion of the image.

Figure 4:
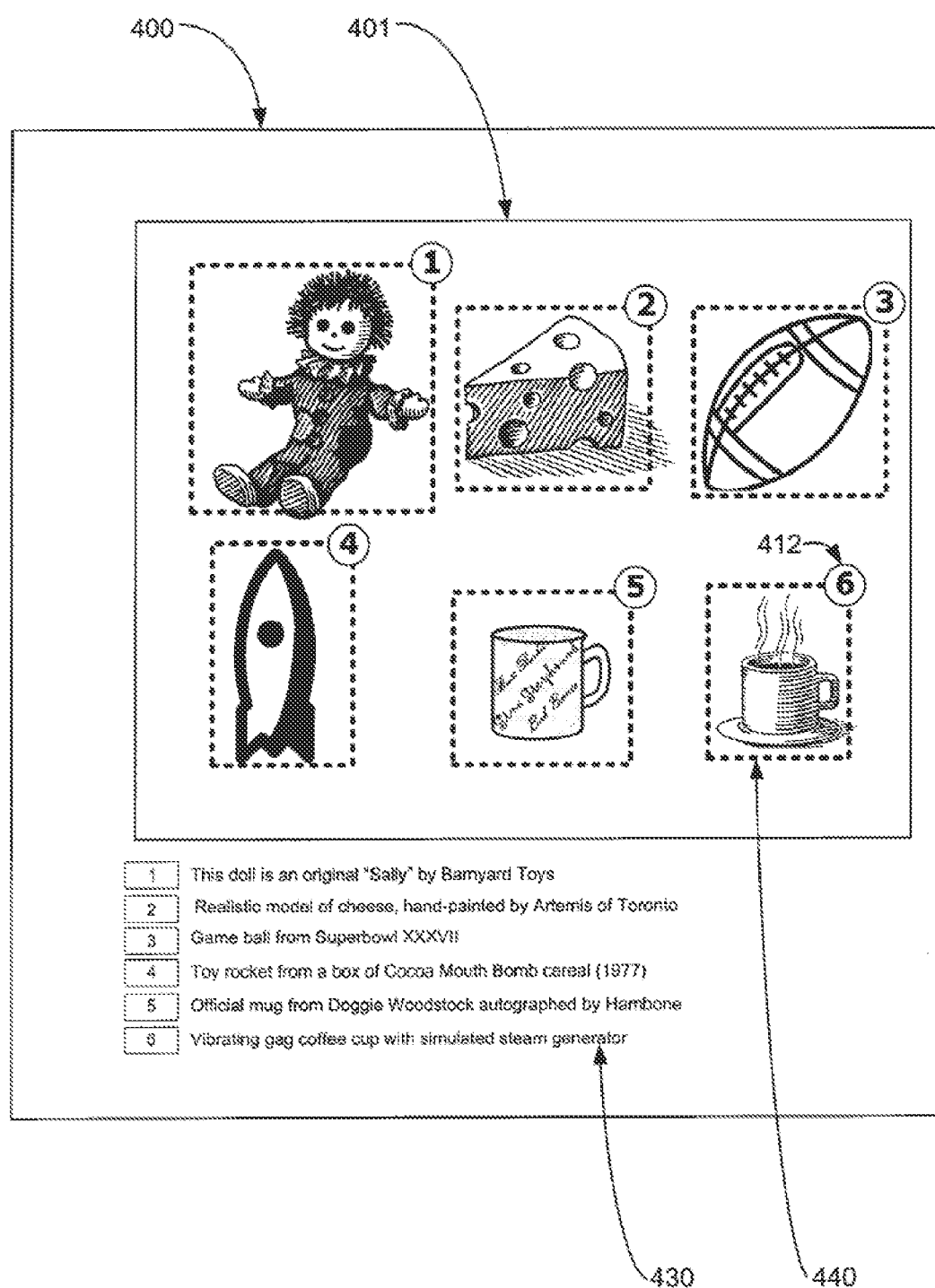
FIG. 4 illustrates one example of a user interface for displaying one or more listed items.

FIG. 4 illustrates one example of a user interface for displaying one or more listed items. A graphical window 400 contains a marked image 401 of multiple items, at least one listed item 440, at least some tag information 430 for the listed item 440, and an item reference 412.

A potential buyer may click on a listed item 440 or its tag information 430 to initiate some action related to a potential or actual sale of the listed item 440. Examples of actions include communicating with a person who listed the listed item 440, making an offer on the listed item 440, asking a question regarding the listed item 440, and/or requesting information about other items similar to the listed item 440.

Certain embodiments omit the item reference 412. In some embodiments, the item reference 412 appears superimposed over the listed item 440.

In certain embodiments, the tag information 430 appears in response to a mouse click or mouse-over event in visual proximity to the listed item 440. In some embodiments, the tag information 430 appears in a pop-up window overlaying the marked image. In some embodiments, the tag information 430 appears in a separate window.

Some embodiments display the tag information 430 without the marked image 401. Some embodiments display the marked image 401 in response to a mouse click or mouse-over event in visual proximity to the tag information 430. Certain embodiments display the tag information 430 without the listed item 440. Certain embodiments display the listed item 440 in response to a mouse click or mouse-over event in visual proximity to the tag information 430.

Figure 5:
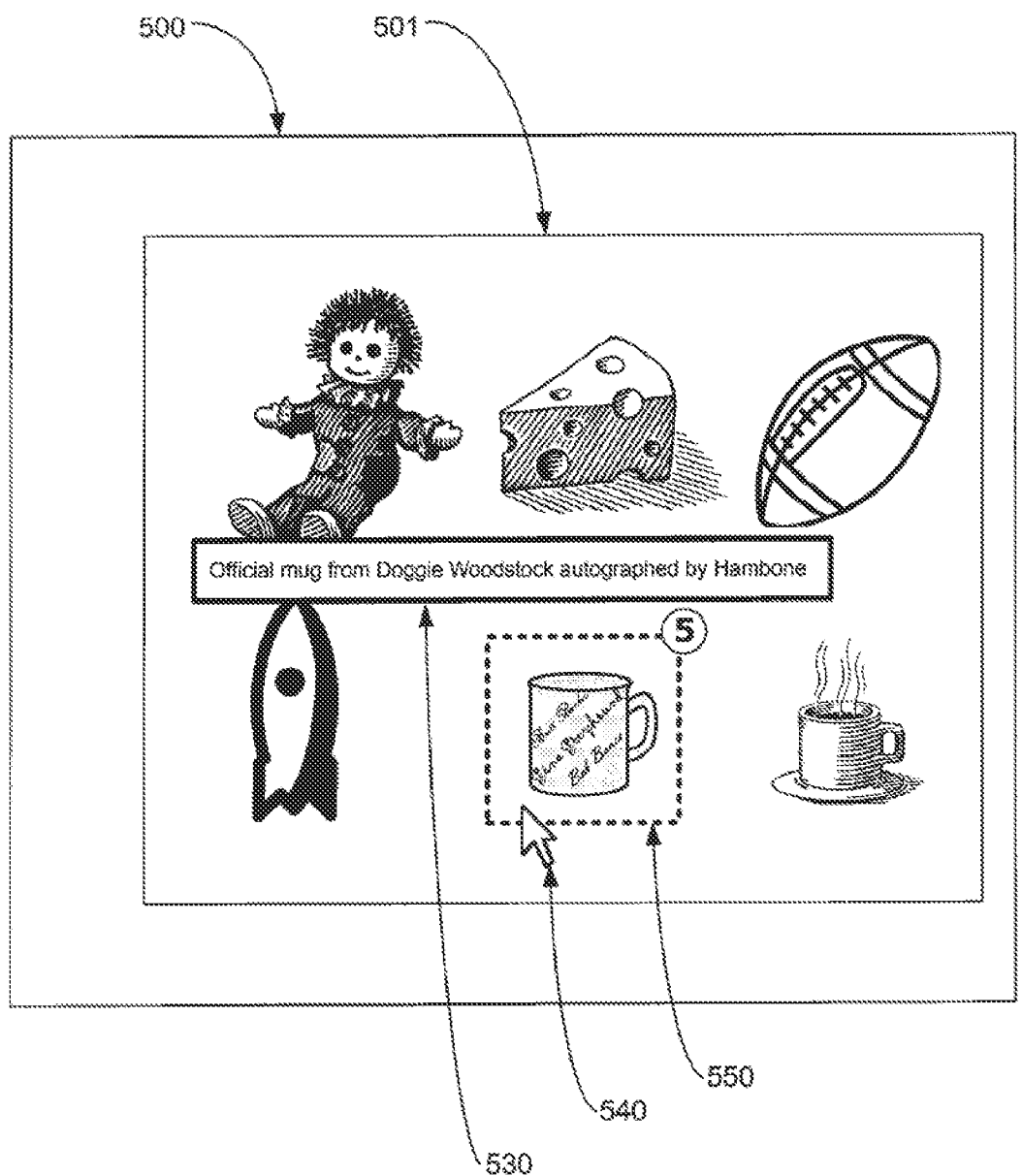
FIG. 5 illustrates a second example of a user interface for displaying one or more listed items.

FIG. 5 illustrates a second example of a user interface for displaying one or more listed items. A graphical window 500 contains a marked image 501 of multiple items, a marked portion 550 of the marked image 501, a cursor 540, and a pop-up window 530.

A potential buyer may mouse-over the marked portion 550, causing the pop-up window 530 to appear. The pop-up window contains some tag information. Examples of tag information that may appear in a pop-up window include a tag label, a description, a category, and/or a price. The pop-up window may appear in any location within view of the potential buyer, and need not necessarily appear in the location shown in the figure.

A potential buyer may click on a marked portion 550 to initiate some action related to a potential or actual sale of a listed item 440 (see FIG. 4). Examples of actions include communicating with a person who listed the listed item 440, making an offer on the listed item 440, asking a question regarding the listed item 440, and/or requesting information about other items similar to the listed item 440. (See FIG. 4).

In some embodiments, the marked portion 550 is delineated by rectilinear lines (e.g., a box shape) and/or curvilinear lines. In certain embodiments, the marked portion 550 is delineated by animated lines. In some embodiments, the marked portion 550 is delineated by invisible markings. In certain embodiments, the marked portion 550 is delineated by visible markings only when a mouse cursor is within visual proximity to the marked portion 550.

Figure 6:
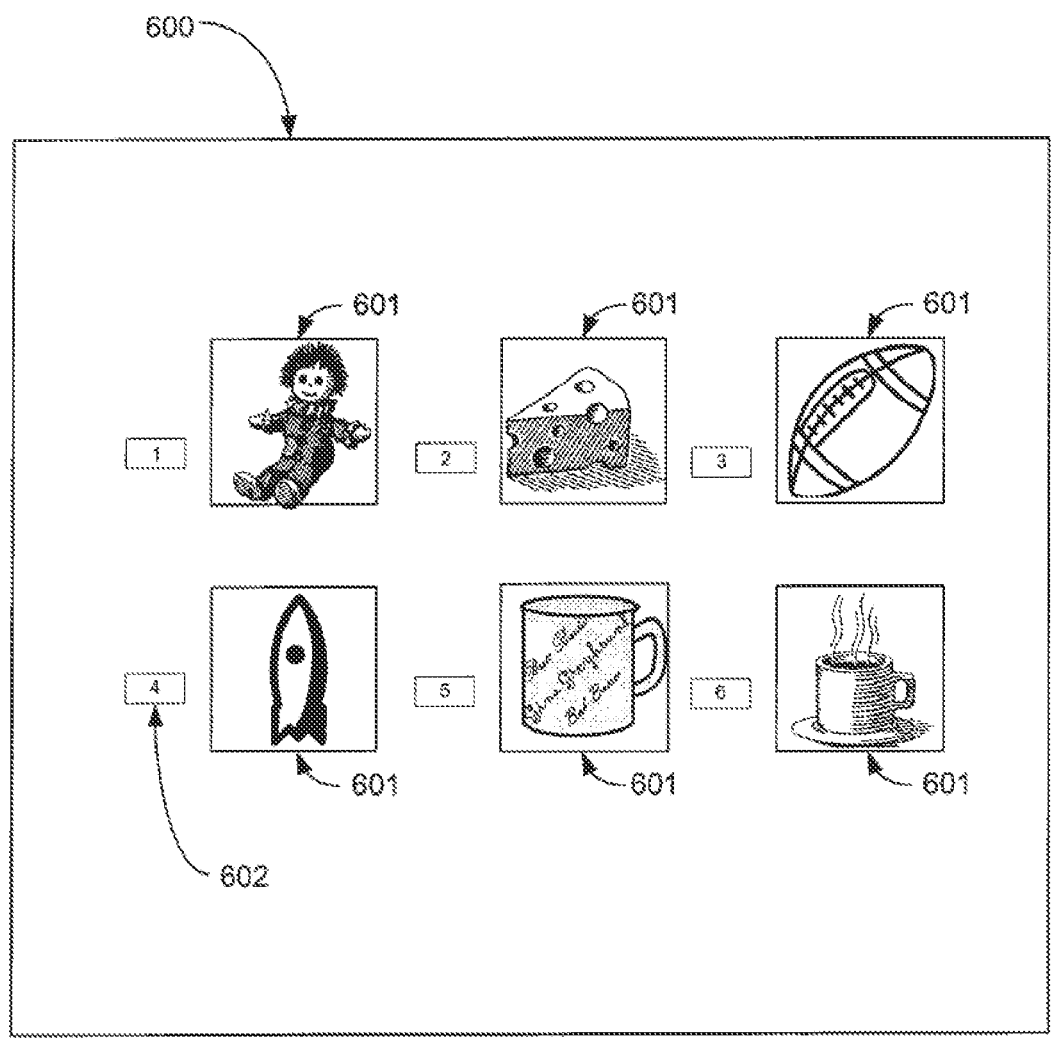
FIG. 6 illustrates a third example of a user interface for displaying one or more listed items.

FIG. 6 illustrates a third example of a user interface for displaying one or more listed items. A graphical window 600 contains at least one thumbnail image 601 of a listed item 440 (see FIG. 4). A potential buyer may click on the thumbnail image 601 to initiate some action related to the potential or actual sale of the listed item 440. Examples of actions include communicating with a person who listed the listed item 440, making an offer on the listed item 440, asking a question regarding the listed item 440, and/or requesting information about other items similar to the listed item 440. (See FIG. 4).

In some embodiments, an item reference 602 appears in visual association with a thumbnail image 601. In some embodiments, the item reference 602 appears superimposed over the thumbnail image 601.

In some embodiments, a potential buyer may mouse-over the thumbnail image 601 and/or an item reference 602, causing a pop-up window 530 to appear. (See FIG. 5). In certain embodiments, the pop-up window contains some tag information. (See FIG. 5). Examples of tag information that may appear in a pop-up window include a tag label, a description, a category, and/or a price.

Figure 7:
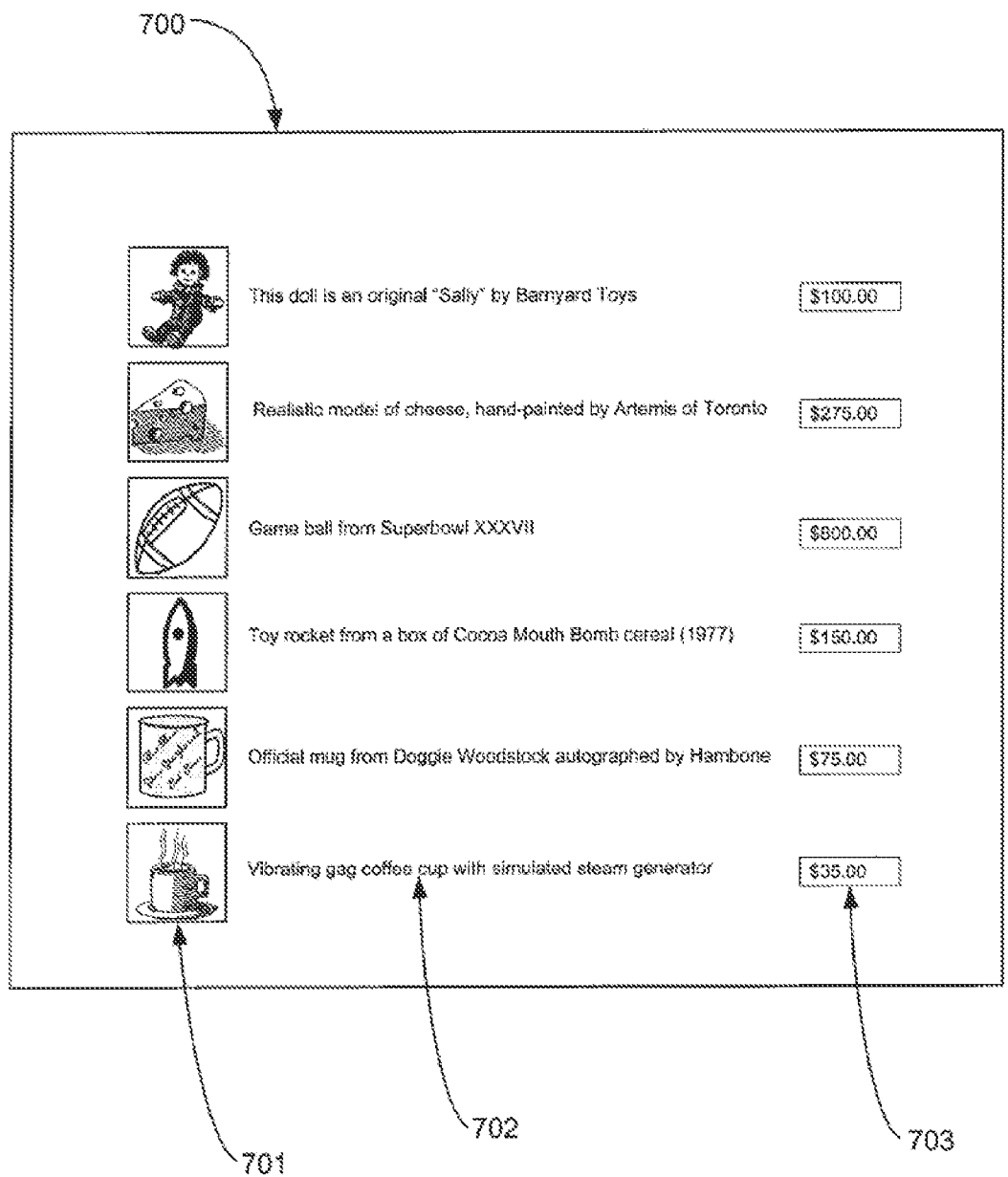
FIG. 7 illustrates a fourth example of a user interface for displaying one or more listed items.

FIG. 7 illustrates a fourth example of a user interface for displaying one or more listed items. A graphical window 700 contains at least one thumbnail image 701 of a listed item 440 (see FIG. 4), at least some tag information 702 associated with the listed item 440, and a price 703 for the listed item 440.

A potential buyer may click on a thumbnail image 701 of the listed item 440, the tag information 702, and/or the price 703 to initiate some action related to a potential or actual sale of the listed item 440. Examples of actions include communicating with a person who listed the listed item 440, making an offer on the listed item 440, asking a question regarding the listed item 440, and/or requesting information about other items similar to the listed item 440. (See FIG. 4).

Figure 8:
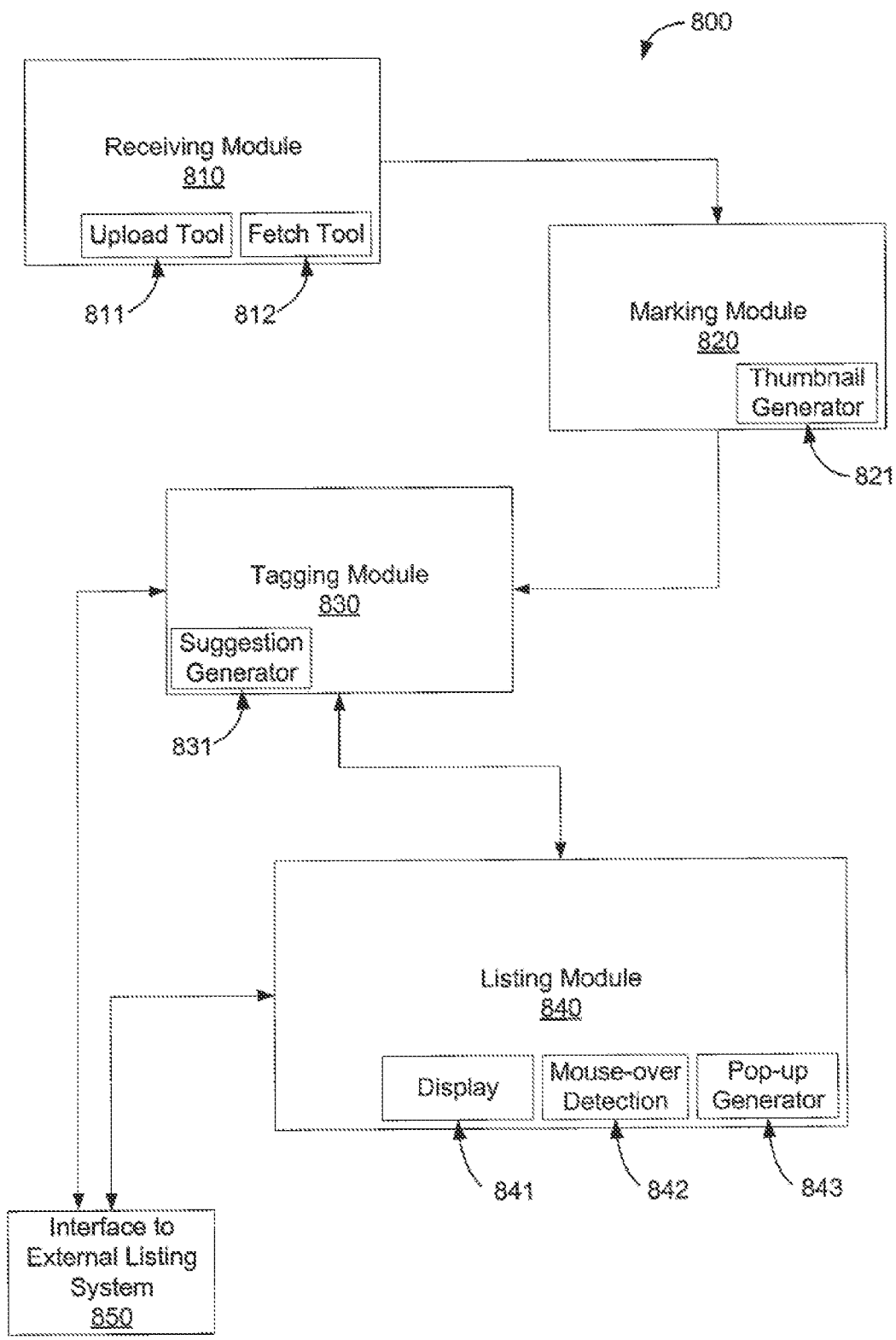
FIG. 8 is a block diagram of an example embodiment of a system for image-based listing using an image of multiple items.

FIG. 8 is a block diagram of an example embodiment. An example system 800 contains a marking module 820, a tagging module 830, and a listing module 840.

For the purposes of this specification, a "module" includes an identifiable portion of code or data or computational object to achieve a particular function, operation, processing, or procedure.

Some embodiments contain a receiving module 810 to receive an image of multiple items. In certain embodiments, the receiving module 810 contains an upload tool 811 to allow the user to upload the image of multiple items. In some embodiments, the receiving module 810 contains a fetch tool 812 to obtain the image of multiple items from a remote location (e.g., a third-party website). In some embodiments, the receiving module 810 is able to capture the image directly (e.g., a camera or a video recording device).

The marking module 820 operates to identify and mark the image of multiple items. In some embodiments, the marking module 820 operates to delineate, circumscribe, and/or highlight the portion of the image to be marked. The marking module 820, in some embodiments, contains a thumbnail generator 821 to perform image processing operations on a marked portion of the image of multiple items. Example operations include cropping, matting, padding, shrinking, stretching, panning, zooming, sharpening, blurring, edge detection, rotating, mirroring, distorting, color correction, color enhancement, and/or color removal.

The tagging module 830 operates to associate (e.g., tag) the marked portion of the image of multiple items with tag information. The tagging module 830, in certain embodiments, contains a suggestion generator 831 to provide suggested tag information to the user. The suggestion generator 831 bases suggestions on information associated with items previously listed by the example system or by other similar systems. In some embodiments, the suggestions are copied from information associated with a previously listed item. For example, a suggested description may be directly copied from the description of a similar item. In certain embodiments, the suggestions are based on aggregated information for multiple items previously listed. For example, a suggested price may be calculated from the final sales prices of recently sold similar items. The information used to generate suggestions need not necessarily be "tag information" associated with a previously listed item, but rather may be any information associated with the previously listed item.

The listing module 840 operates to list a tagged (e.g., marked) item. As used herein, "listing" an item refers to communicating tag information associated with the item to facilitate a potential or actual sale of the item. The listing module 840, in certain embodiments, contains a display sub-module 841 to display the listed item to a potential buyer. For example, the display sub-module 841 may generate a graphical window (e.g., one or more of the graphical windows shown in FIGS. 4, 5, 6, and 7, as described above).

The listing module 840, in certain embodiments, contains a mouse-over detection sub-module 842. The mouse-over detection sub-module 842 detects a mouse-over event and initiates a response from the listing module 840. For example, a response may be to initiate an action in the pop-up generator 843.

The listing module 840, in certain embodiments, contains a pop-up generator 843. The pop-up generator 843 generates a pop-up window in response to an event. Example events include a mouse click, a mouse-over event, or other cursor behavior. In some embodiments, the pop-up generator 843 generates a pop-up window over some portion of the marked image of multiple items. In certain embodiments, the pop-up generator 832 generates a pop-up window in visual proximity to a mouse cursor.

Some embodiments contain an interface to an external listing system 850 to communicate listing information with another listing system. For example, an interface to an external listing system 850 transmits a listing for an item to an online auction website. In some embodiments, the interface to an external listing system 850 receives listing information from an online auction website for use by the tagging module 830. In certain embodiments, the interface to an external listing system 850 receives listing information from an online auction website for use by the listing module 840. The external listing system need not necessarily be an image-based listing system.

Figure 9:
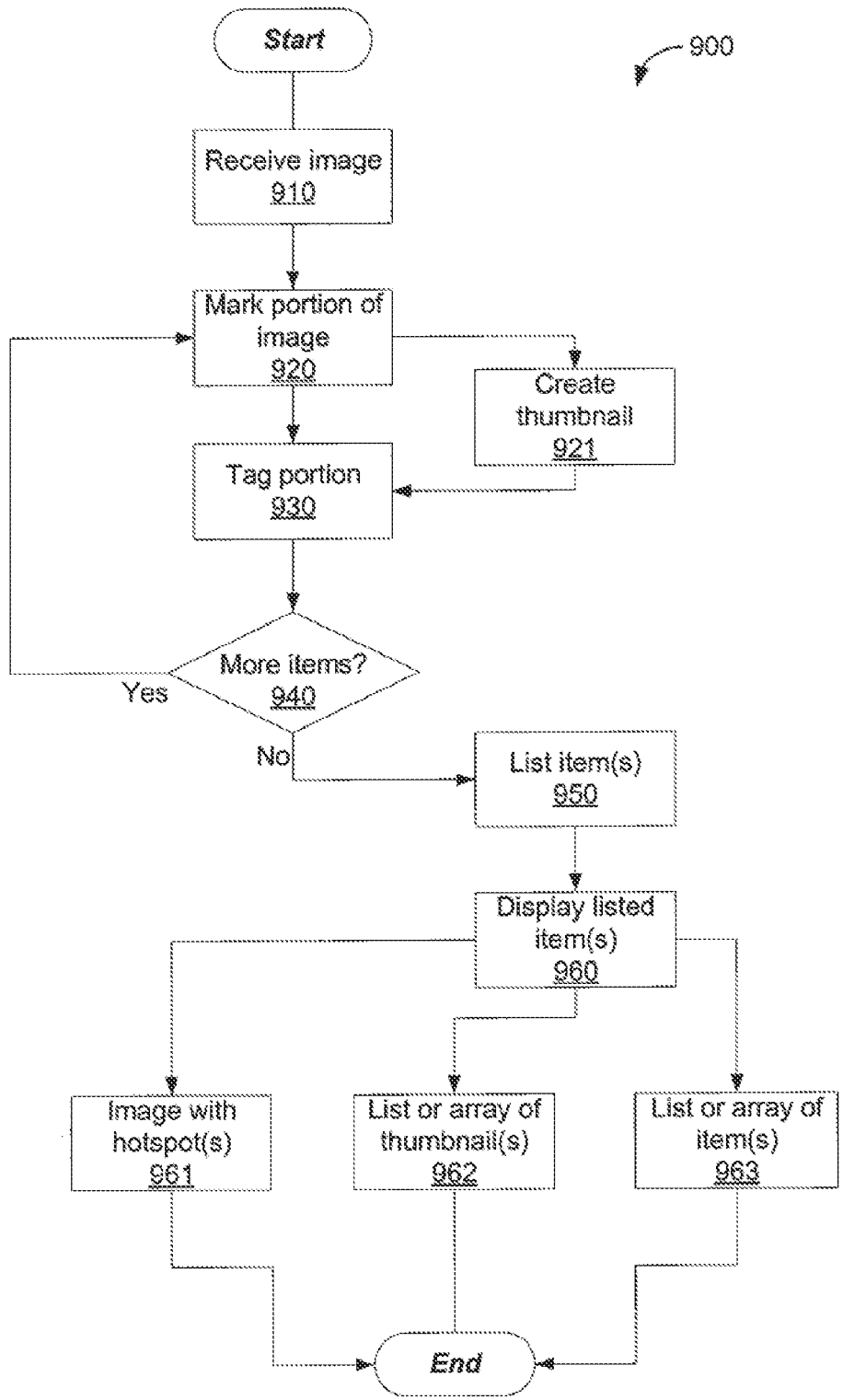
FIG. 9 is a flow chart of a procedure for image-based listing in accordance with some example embodiments.

FIG. 9 is a flow chart of detailed method 900, according to some example embodiments, for image-based listing of an item.

At operation 910, an example system receives an image of multiple items.

At operation 920, the system identifies and marks a portion of the image. In some embodiments, the marked portion of the image is centered on an item to be listed. In certain embodiments, the system marks the portion in response to supervision by a user. In other embodiments, the system marks the portion automatically. At operation 921, the system creates a thumbnail image of the item to be listed. In some embodiments, operation 921 is omitted.

At operation 930, the system allows a user to tag the portion of the image with tag information. In some embodiments, the system allows a user to enter some tag information (e.g., a description). In certain embodiments, the system provides, based on tag information entered by the user, a suggestion for further tag information (e.g., a detailed description, or a price).

At operation 940, if any additional items are to be listed, the system performs marking (e.g., operation 920), thumbnail creation (e.g., operation 921), and tagging (e.g., operation 930) for the additional item(s).

At operation 950, the system lists the items that have been marked and tagged with tag information.

At operation 960, the system displays at least one listed item to a potential buyer or other person interested in the listed item(s). The example system may display an image with one or more "hotspots" (e.g., operation 961), a list or array of thumbnail images (e.g., operation 962), and/or a list or array of items (e.g., operation 963). In some embodiments, a hotspot, a list, and/or an array may respond to mouse cursor behavior. An example system may respond to a mouse click, a mouse-over event, or other cursor behavior by initiating some action related to the potential or actual sale of the listed item. Examples of actions include displaying a pop-up window containing some tag information 530 (see FIG. 5), communicating with a person who listed the listed item 440, making an offer on the listed item 440, asking a question regarding the listed item 440, and/or requesting information about other items similar to the listed item 440. (See FIG. 4).

Although the individual operations of method 900 are illustrated and described as separate operations, one or more of the individual operations may be performed concurrently.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Figure 10:
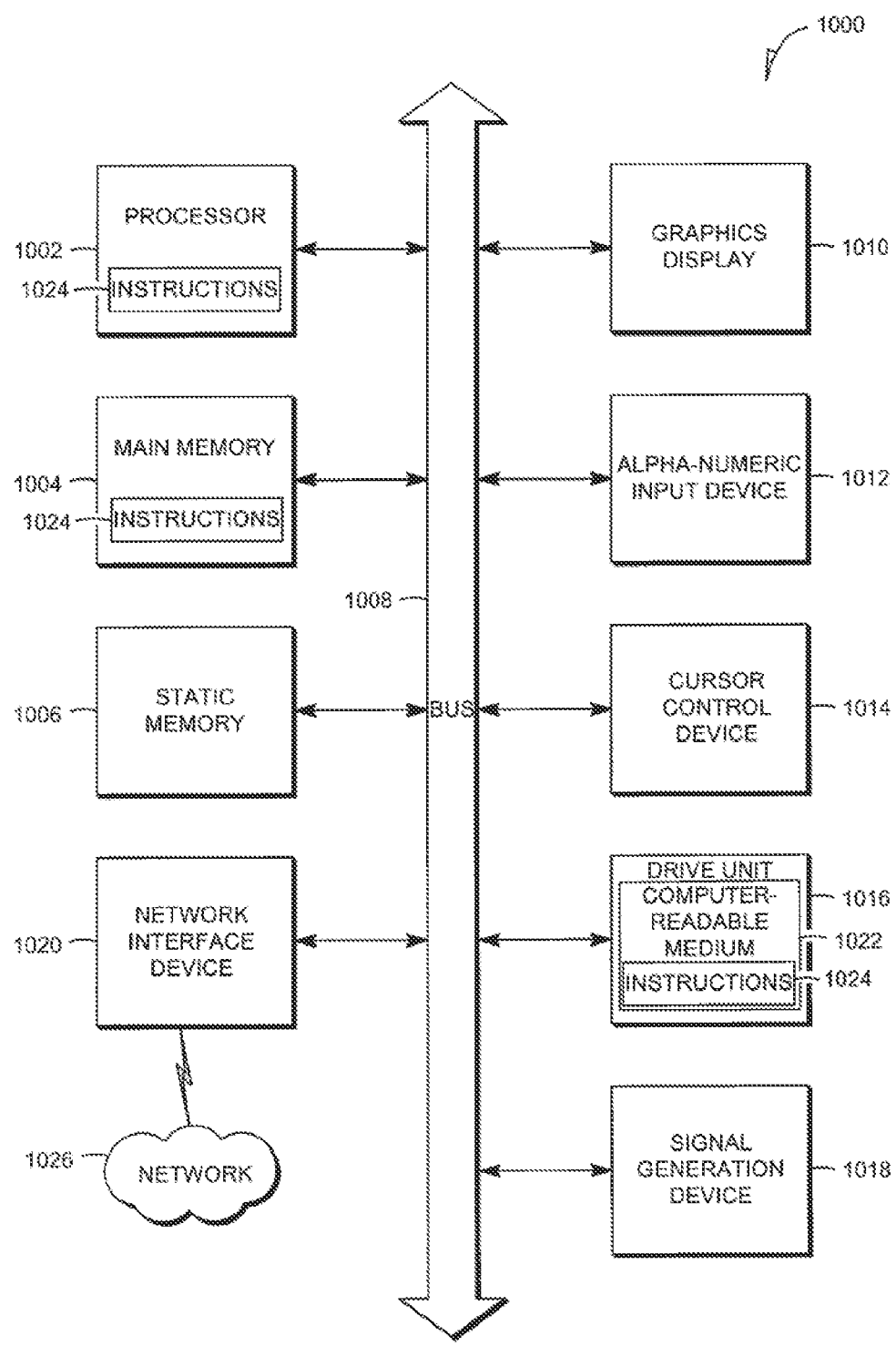
FIG. 10 is a block diagram illustrating components of an example machine able to read, from a machine-readable medium, instructions implementing an example method for image-based listing using an image of multiple items.

FIG. 10 shows a diagrammatic representation of machine in the example form of a computer system 1000 within which a set of instructions 1024 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a smartphone, a web appliance, a network router, switch or bridge, or any machine capable of executing a set of instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a central processing unit (CPU), a graphics processing unit (GPU), a digital signal processor (DSP), application specific integrated circuits (ASICs), radio-frequency integrated circuits (RFICs), or any combination of these), a main memory 1004, and a static memory 1006, which communicate with each other via a bus 1008. The computer system 1000 may further include a graphics display unit 1010 (e.g., a plasma display panel (PDP), a liquid crystal display (LCD), a projector, or a cathode ray tube (CRT)). The computer system 1000 may also include an alphanumeric input device 1012 (e.g., a keyboard), a cursor control device 1014 (e.g., a mouse, a trackball, a joystick, a motion sensor, or other pointing instrument), a drive unit 1016, a signal generation device 1018 (e.g., a speaker), and a network interface device 1020.

The drive unit 1016 includes a machine-readable medium 1022 on which is stored one or more sets of instructions 1024 (e.g., software or firmware) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A computer-implemented method, comprising:

receiving an image including representations of a plurality of items;

processing the image to automatically identify and automatically mark a plurality of portions of the image, wherein each portion corresponds to a single item of the plurality of items;

receiving a first tag comprising price information for a first item of the plurality of items;

associating the first tag with the first item of the plurality of items; and generating a first listing for the first item of the plurality of items, wherein the first listing includes the first tag associated with the first item of the plurality of items and a first portion of the plurality of portions of the image corresponding to the first item of the plurality of items.

2. The computer-implemented method of claim 1, wherein processing the image to automatically mark the plurality of portions of the image further comprises:
displaying one or more graphical elements that partition the first item of the plurality of items from a second item of the plurality of items.

3. The computer-implemented method of claim 1, further comprising:
transmitting a request to present one or more listings;
responsive to the request, presenting the image including the representations of the plurality of items;
receiving input to the first portion of the plurality of portions of the image corresponding to the first item of the plurality of items; and
responsive to the input, presenting the first tag associated with the first item.

4. The computer-implemented method of claim 3, wherein receiving the input includes detecting a pointer overlying the first portion.

5. The computer-implemented method of claim 3, further comprising:
receiving a selection of the first portion; and
responsive to the selection, presenting the first listing corresponding to the first item, wherein the first listing is one of the one or more listings.

6. The computer-implemented method of claim 1, further comprising:
transmitting a request to present one or more listings;
responsive to the request, presenting a plurality of thumbnails representing the plurality of items, wherein each thumbnail corresponds to one portion of the plurality of portions of the image;
receiving input to a first thumbnail of the plurality of thumbnails corresponding to the first item of the plurality of items; and
responsive to the input, presenting the first tag associated with the first item.

7. The computer-implemented method of claim 1, further comprising:
transmitting a request to present one or more listings;
responsive to the request, presenting two or more listings corresponding to two or more items of the plurality of items;
receiving input to the first listing, wherein the first listing is one of the two or more listings; and
responsive to the input, presenting the first tag associated with the first item corresponding to the first listing.

8. The computer-implemented method of claim 1, further comprising:
generating, automatically based on prior listing information, one or more suggested tags for at least one of a plurality of tags; and
receiving a selection of a first suggested tag of the one or more suggested tags to associate with the first item of the plurality of items.

9. The computer-implemented method of claim 8, wherein generating the one or more suggested tags includes:
receiving item information of a second item that is related to the first item; and
extracting the one or more suggested tags from the item information.

10. The computer-implemented method of claim 8, wherein generating the one or more suggested tags includes:
receiving item information of each of a second plurality of items that are related to the first item; and
determining at least one suggested tag by aggregating the item information of each of the second plurality of items.

11. A computer-implemented method, comprising:
receiving an image including representations of a plurality of items;
processing, by one or more processors, the image to automatically identify and automatically mark a plurality of portions of the image, wherein each portion corresponds to one item of the plurality of items;
receiving a plurality of tags, wherein each tag comprises price information for a corresponding item of the plurality of items;
associating each tag with the corresponding item of the plurality of items; and
generating at least a first listing of a plurality of listings, wherein the first listing includes a first tag of the plurality of tags and a first portion of the plurality of portions of the image corresponding to a first item of the plurality of items.

12. The computer-implemented method of claim 11, further comprising:
receiving a request to present the plurality of listings; and
responsive to the request, presenting the image including representations of the plurality of items.

13. The computer-implemented method of claim 11, further comprising:
receiving a request to present the plurality of listings; and
responsive to the request, presenting a plurality of thumbnails representing the plurality of items, wherein each thumbnail corresponds to one of the plurality of items.

14. The computer-implemented method of claim 11, further comprising:
generating, automatically based on prior listing information, one or more suggested tags for at least one of the plurality of tags; and
presenting the one or more suggested tags.

15. A computing system, comprising:
one or more processors; and
memory including instructions that, upon execution by the one or more processors, cause the computing system to perform operations comprising:
receiving an image including representations of a plurality of items;
processing the image to automatically identify and automatically mark a plurality of portions of the image, wherein each portion corresponds to a single item of the plurality of items;
receiving a first tag comprising price information for a first item of the plurality of items;
associating the first tag with the first item of the plurality of items; and
generating a first listing for the first item of the plurality of items, wherein the first listing includes the first tag associated with the first item of the plurality of items and a first portion of the plurality of portions of the image corresponding to the first item of the plurality of items.

16. The computing system of claim 15, wherein processing the image to automatically mark the plurality of portions of the image further comprises:

displaying one or more graphical elements that partition the first item of the plurality of items from a second item of the plurality of items.

17. The computing system of claim 15, wherein the instructions, upon execution by the one or more processors, cause the computing system to perform further operations comprising:

transmitting a request to present one or more listings;

responsive to the request, presenting the image including representations of the plurality of items;

receiving input to the first portion of the plurality of portions of the image corresponding to the first item of the plurality of items; and responsive to the input, presenting the first tag associated with the first item.

18. The computing system of claim 17, wherein receiving the input includes detecting a pointer overlying the first portion.

19. The computing system of claim 17, wherein the instructions, upon execution by the one or more processors, cause the computing system to perform further operations comprising:

receiving a selection of the first portion; and responsive to the selection, presenting the first listing of the one or more listings corresponding to the first item.

20. The computing system of claim 15, wherein the instructions, upon execution by the one or more processors, cause the computing system to perform further operations comprising:

transmitting a request to present one or more listings;

responsive to the request, presenting a plurality of thumbnails representing the plurality of items, wherein each thumbnail corresponds to one portion of the plurality of portions of the image;

receiving input to a first thumbnail of the plurality of thumbnails corresponding to the first item of the plurality of items; and responsive to the input, presenting the first tag associated with the first item.

\* \* \* \* \*